(12) United States Patent
Swift et al.

(10) Patent No.: US 7,636,690 B2
(45) Date of Patent: *Dec. 22, 2009

(54) APPARATUS AND METHODS FOR PROCESSING MISREAD OR MISKEYED MAGNETIC INDICIA

(75) Inventors: Amy Swift, Albuquerque, NM (US); Waisum Mok, Houston, TX (US)

(73) Assignee: First Data Corporation, Greenwood Village, CO (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/746,524

(22) Filed: May 9, 2007

(65) Prior Publication Data

US 2007/0217669 A1 Sep. 20, 2007

Related U.S. Application Data

(62) Division of application No. 10/057,001, filed on Jan. 25, 2002.

(51) Int. Cl.
*G06Q 40/00* (2006.01)
(52) U.S. Cl. .............................. 705/45; 235/375; 705/35
(58) Field of Classification Search ................... 705/43, 705/45, 35, 42, 44
See application file for complete search history.

(56) References Cited

U.S. PATENT DOCUMENTS

| | | | |
|---|---|---|---|
| 5,175,682 | A | 12/1992 | Higashiyama et al. |
| 5,444,616 | A | 8/1995 | Nair et al. |
| 5,679,938 | A | 10/1997 | Templeton et al. |
| 5,679,940 | A | 10/1997 | Templeton et al. |
| 6,073,121 | A | 6/2000 | Ramzy |
| 6,392,571 | B1 * | 5/2002 | Chen et al. ................... 341/60 |
| 6,464,134 | B1 | 10/2002 | Page |
| 6,769,615 | B2 | 8/2004 | Resseguie |
| 7,092,561 | B2 | 8/2006 | Downs |
| 2003/0225695 | A1 | 12/2003 | Park |

OTHER PUBLICATIONS

Lunt Penny (What truly deters check fraud? ABA Banking Journal v87n2 pp. 74-78, Feb. 1995).*

(Continued)

*Primary Examiner*—Ojo O Oyebisi
(74) *Attorney, Agent, or Firm*—Sutherland Asbill & Brennan LLP

(57) ABSTRACT

The present invention is directed to methods and apparatus for processing check data, such as data stored using magnetic indicia. In one embodiment, a check transaction processing system receives an indication that a first check transaction from a first payor failed to clear because at least a portion of first MICR or other account data associated with the first check transaction is incorrect. The check transaction processing system reads a personal identifier associated with the first payor, wherein the personal identifier was provided in association with the first check transaction. MICR data or other account data associated with a previously processed check transaction associated with the personal identifier is located. At least a portion of the located MICR or other account data is compared with at least the portion of first MICR or other account data associated with the first check transaction, and based at least in part on the comparison, the check transaction processing system determines if the portion of the located data is at least a potentially correct version of the portion of first MICR or other account data.

20 Claims, 4 Drawing Sheets

OTHER PUBLICATIONS

Disclosure Statement Under 37 C.F.R. § 1.56 for U.S. Appl. No. 11/746,524.
Notice of Allowance dated Mar. 31, 2008 for U.S. Appl. No. 11/746,529.
Office Action dated Feb. 25, 2008 for U.S. Appl. No. 10/057,001.
Disclosure under 37 C.F.R. 1.56 dated Mar. 19, 2009, filed for U.S. Appl. No. 11/746,524.
Final Office Action for U.S. Appl. No. 10/057,001 mailed Oct. 7, 2008.
Advisory Action for U.S. Appl. No. 10/057,001 mailed Jan. 23, 2009.
Non-Final Office Action for U.S. Appl. No. 11/746,529 mailed Jul. 23, 2008.
Notice of Allowance for U.S. Appl. No. 11/746,529 mailed Oct. 7, 2008.

* cited by examiner

| AREA | LOG_NUM | DIGIT_DIFF | RT_DIFF | ACCT_DIFF | OLD_RT | NEW_RT | OLD_ACCT | NEW_ACCT | CHECK_NUM_COLL | CHECK_AMT_COLL | RCV_DT |
|---|---|---|---|---|---|---|---|---|---|---|---|
| 1 | 013050184900 | 3 | 0 | 3 | 322271627 | 322271627 | 7343936510l | 7343936510l | 1129 | 209.98 | 1-Nov-01 |
| 1 | 013050188343 | 1 | 0 | 1 | 301079183 | 301079183 | 2569186 | 2269186 | 2640 | 178.59 | 1-Nov-01 |
| 2 | 013050286508 | 1 | 0 | 1 | 065204579 | 065204579 | 40534708 | 40534708 | 7442 | 8.09 | 1-Nov-01 |
| 2 | 013050286508 | 1 | 0 | 1 | 065204579 | 065204579 | 40534708 | 40534708 | 7442 | 8.09 | 1-Nov-01 |
| 2 | 013050286508 | 1 | 0 | 1 | 065204579 | 065204579 | 40534708 | 40534708 | 7442 | 8.09 | 1-Nov-01 |
| 3 | 013050385020 | 2 | 0 | 2 | 062005690 | 062005690 | 533023342 | 533023342 | 1476 | 148.18 | 1-Nov-01 |
| 3 | 013050385020 | 2 | 0 | 2 | 062005690 | 062005690 | 533023342 | 533023342 | 1476 | 148.18 | 1-Nov-01 |
| 3 | 013050385089 | 1 | 0 | 1 | 253177049 | 253177049 | 068057245999 | 068057245999 | 2114 | 9.51 | 1-Nov-01 |
| 3 | 013050385089 | 1 | 0 | 1 | 253177049 | 253177049 | 068057245999 | 068057245999 | 2114 | 9.51 | 1-Nov-01 |
| 3 | 013050385131 | 3 | 0 | 3 | 053111658 | 053111658 | 550647380l | 550647380l | 6311 | 46.31 | 1-Nov-01 |
| 3 | 013050365569 | 1 | 0 | 1 | 063114807 | 063114807 | 5000816815 | 5000816815 | 1018 | 41.5 | 1-Nov-01 |
| 3 | 013050385577 | 2 | 0 | 2 | 067011142 | 067011142 | 5500446306 | 5500446306 | 1045 | 13.2 | 1-Nov-01 |
| 3 | 013050385577 | 2 | 0 | 2 | 067011142 | 067011142 | 5500446306 | 5500446306 | 1045 | 13.2 | 1-Nov-01 |
| 3 | 013050388464 | 2 | 0 | 2 | 291074722 | 291074722 | 005044462O5 | 005044462O5 | 1871 | 10 | 1-Nov-01 |
| 3 | 013050388464 | 2 | 0 | 2 | 291074722 | 291074722 | 005044462O5 | 005044462O5 | 1871 | 10 | 1-Nov-01 |
| 5 | 013050585344 | 1 | 0 | 1 | 111900659 | 111900659 | 0276843365 | 0276843365 | 1329 | 5.94 | 1-Nov-01 |
| 5 | 013050585344 | 1 | 0 | 1 | 111900659 | 111900659 | 0276843365 | 0276843365 | 1329 | 5.94 | 1-Nov-01 |
| 5 | 013050585573 | 1 | 0 | 1 | 121301028 | 121301028 | 0053270478 | 0053270478 | 142 | 12.71 | 1-Nov-01 |
| 20 | 013052088012 | 1 | 0 | 1 | 264271390 | 264271390 | 0100364135 | 0100364135 | 368 | 50 | 1-Nov-01 |
| 20 | 013052088012 | 1 | 0 | 1 | 264271390 | 264271390 | 0100364135 | 0100364135 | 368 | 50 | 1-Nov-01 |

302, 304, 306, 308

| PRSN_ID_1 | STAT_CDE | SUBSCR_CODE | SOURCE_AREA | SOURCE_MICR |
|---|---|---|---|---|
| CFP0428027 | A | 132356 | 35 | Coll Detail |
| KSK00908296 | A | 383344 | 1 | Coll Detail |
| LA7082383 | A | 18383 | 2 | Coll Detail |
| LA7082383 | A | 18383 | 35 | Coll Detail |
| AL2616863 | A | 150427 | 37 | Coll Detail |
| AL2616863 | A | 150427 | 3 | Collections |
| RL8452586 | A | 390380 | 35 | Coll Detail |
| RL8452586 | A | 390380 | 37 | Coll Detail |
| RL75609905 | A | 581384 | 11 | Coll Detail |
| FLE215214577890 | A | 128809 | 3 | Coll Detail |
| FLG5241284984l | A | 131022 | 3 | Coll Detail |
| FLG5241284984l | A | 131022 | 11 | Coll Detail |
| GA263330054 | A | 342593 | 3 | Coll Detail |
| GA263330054 | A | 342593 | 37 | Coll Detail |
| TX085O7937 | A | 667998 | 5 | Coll Detail |
| TX085O7937 | A | 667998 | 35 | Coll Detail |
| TX085O7937 | A | 667998 | 37 | Coll Detail |
| HIH00196542 | A | 787317 | 5 | Coll Detail |
| TN79080841 | A | 806754 | 20 | Coll Detail |
| TN79080841 | A | 806754 | 35 | Coll Detail |

APPARATUS AND METHODS FOR PROCESSING MISREAD OR MISKEYED MAGNETIC INDICIA

This application is a divisional of U.S. application Ser. No. 10/057,001, filed on Jan. 25, 2002, the entirety of which is hereby incorporated herein by reference.

BACKGROUND OF THE INVENTION

1. Field of the Invention

The present invention relates to processing magnetic indicia, and in particular, to methods and apparatus for processing misread or miskeyed magnetic indicia formed or stored on financial instruments.

2. Description of the Related Art

Checks are one of the most common forms of making non-cash payment. However, the processing of physical checks can be manually intensive and so it has become common for checks to be electronically processed. For example, when a customer makes a purchase at a merchant's point of sale terminal, the cashier scans the magnetic ink character recognition (MICR) characters printed at the bottom of a check using a check reader terminal. Alternatively, the customer or merchant may manually key in the MICR data. The MICR characters typically include the customer's checking account number. In addition, the MICR indicia can include the drawee bank's transit or routing number, and the check sequence number.

The cashier manually enters the check amount using the point of sale terminal. The cashier may also capture an image of the check. In addition, to provide greater security, some merchants obtain the customer's driver's license number or alternate ID by scanning the magnetic strip on the customer's driver's license or by keying in the driver's license or alternate number, or by having the customer key in their driver's license or alternate number. Alternatively, merchant's sometimes have websites, wherein the customer enters the MICR and ID data by keying in the data into an electronic form rather than via a point of sale store terminal.

The checking account number, other MICR data, the check amount, the driver's license number or alternate ID number, and other transaction related information may be sent to a check processing service. The check processing service then validates the information, and if the consumer authorized the transaction for automated electronic check processing, the check processing service submits the MICR data, including checking account number, check amount and other related information to a check clearinghouse, such as the Automated Clearing House Network (ACH). ACH provides for the interbank clearing of electronic payments for participating depository financial institutions. The customer's account is then debited for the amount of the check by the debited bank.

Unfortunately, the process of reading and decoding check MICR characters is often somewhat unreliable. In the case of manual entry, consumer and merchant input of the MICR line data can also be unreliable due to the transposing of numbers and/or the miskeying of the numbers. Indeed, it is estimated that about 10% of administrative check returns are the result of incorrect MICR readings or miskeying, also known as decoding errors. For example, if the MICR characters are misread or miskeyed, the check may be submitted to the wrong bank and will not be cleared. Alternatively, the check may be submitted to the correct bank, but with an incorrect account number, and so the check will not clear. The misreading or miskeying can be random, that is, it is not easy to predict the location or the character that will be misread or miskeyed, or how a misread or miskeyed character will be interpreted. Thus, even when check processors have attempted to research to resolve what the account number might be, the result is usually incorrect and the check fails to clear. Because the account number is not accurate, the check is simply never cleared, resulting in significant financial losses on the part of merchants or check processing company.

SUMMARY OF THE INVENTION

Embodiments of the present invention relate to processing magnetic data, and in particular, to methods and apparatus for processing misread, miskeyed or otherwise corrupted magnetic data located on financial instruments. Other embodiments of the present invention relate to processing financial instrument indicia that were misread using an optical scanner or magnetic reader, or where the customer or merchant miskeyed the MICR.

In particular, one embodiment of the present invention is directed to processing check MICR (magnetic ink character recognition) indicia and the like. Methods and apparatus are provided for selecting alternate MICR data when check MICR characters, such as account numbers, are corrupted. For example, the MICR characters may have been misread or decoded incorrectly or miskeyed by the customer or merchant. Thus, the present invention advantageously enables a higher rate of check clearance with resulting benefits to merchants and check processing operators.

In one example embodiment, if a check has failed to clear because the customer's account number was corrupted, an attempt is made to find a correct account number for the check. If the check had been submitted at a point of sale terminal, or using an electronic or paper form, with an associated separate or personal identification code, such as a driver's license number, state or government issued ID, personal device ID (such as a transponder ID), private label card number, social security number, or other identifier, that identification code is located and read from a transaction database. The transaction database is then searched to locate MICR data of previously or subsequently cleared checks associated with the separate identification code. A comparison is made between the corrupted MICR data and the located MICR data. If the comparison indicates that one of the account numbers included in the located MICR data is close to the incorrect check account number, then that check account number is used as an alternate check account number. In particular, in one embodiment if a check account number is located that differs from the incorrect account number by less than a first amount, then that located account number is designated as the correct account number. The check is then resubmitted for clearing with the designated correct account number.

By way of further example, each digit of the incorrect, corrupted account number is compared with a corresponding digit in one of the located account numbers. If an acceptance criterion is met, for example, where less than a predetermined number of digits differ, then that located account number is used when resubmitting the check for clearing. The acceptance criteria may vary based on a number of factors, such as amount of the check at issue, how the check MICR data was entered, how long ago the located account number was last used, and/or other factors. In addition, if more than one of the located account numbers differ from the incorrect account number by more than a predetermined number of digits, optionally, none of the located account numbers will be used in a resubmission of the check.

In one embodiment of the present invention, a check transaction is processed as follows. An indication is received that a first check transaction from a first payor failed to clear at least in part because a first account number associated with the first check is erroneous. A separate identifier for the first payor is located. A first previously cleared check transaction associated with the separate identifier is located. A second account number associated with the separate identifier is read and compared with the account number of the first previously cleared check transaction. At least the first account number is compared with at least the second account number. A determination is made as to whether the second account number meets a first criterion, which thereby indicates the second account number is potentially a correct version of the first account number.

In another embodiment of the present invention, a financial transaction is processed as follows. An indication is received that a first financial transaction from a first payor failed to clear at least in part because a first account number associated with the first financial transaction is erroneous. A separate identifier for the first payor is located. A first previously processed financial transaction associated with the separate identifier is located. A second account number is read, the second account number associated with the first previously processed financial transaction. At least the first account number is compared with at least the second account number. A determination is made as to whether the second account number meets a first criterion, which thereby indicates the second account number is potentially a correct version of the first account number.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 3 illustrates a portion of an example MICR replacement table in accordance with one embodiment of the present invention.

DETAILED DESCRIPTION OF PREFERRED EMBODIMENTS

Embodiments of the present invention relate to methods and apparatus for processing misread or miskeyed magnetic data located on financial instruments, such as checks and check cards. Other embodiments of the present invention relate to processing financial instrument indicia that were misread using an optical scanner or a magnetic check reader or miskeyed by the customer or merchant.

As discussed in greater detail below, certain embodiments of the present invention are related to methods and apparatus for selecting alternate check MICR (magnetic ink character recognition) data, such as an account number, when the check MICR data was originally read or entered incorrectly.

Figure 1:
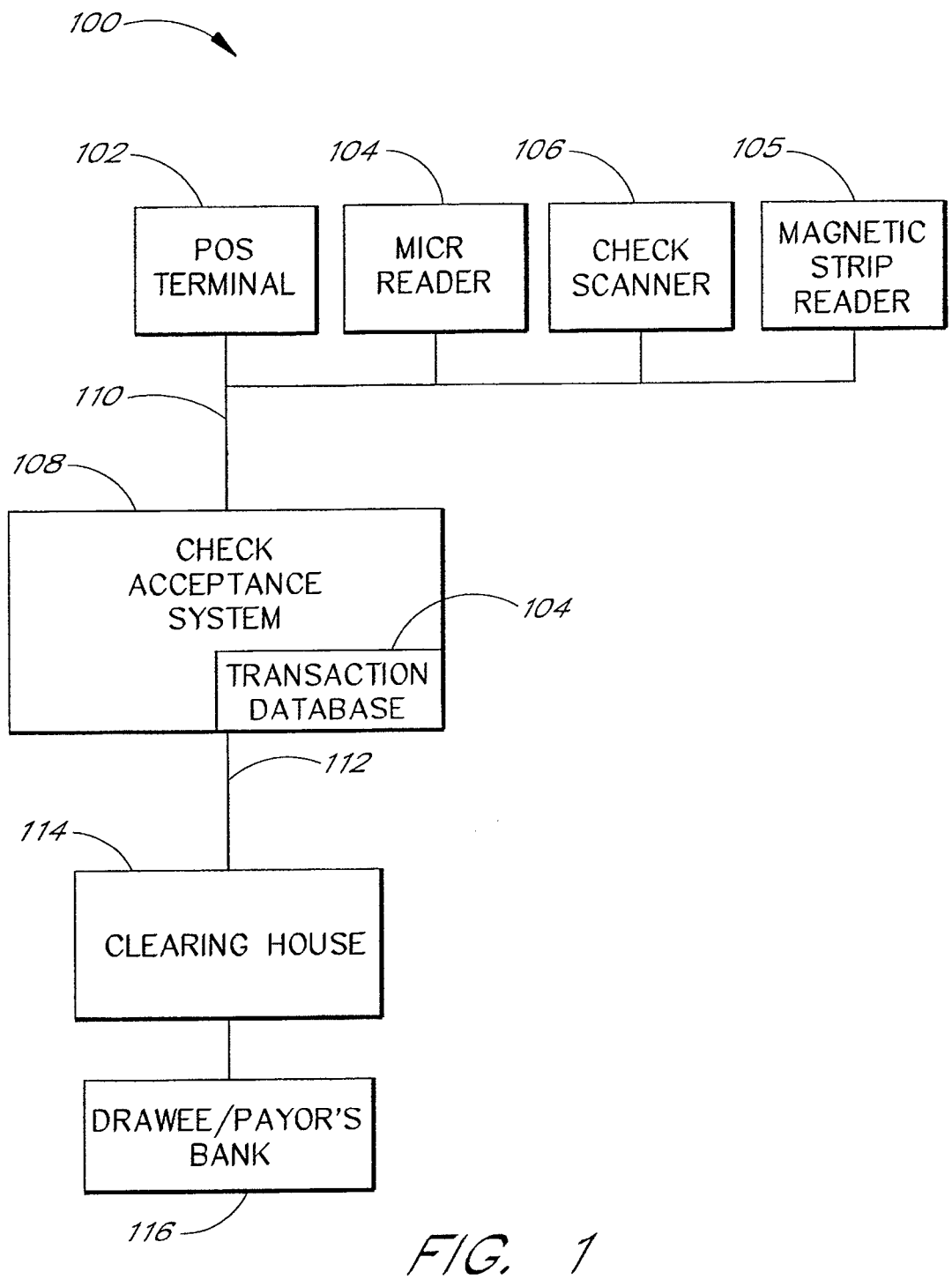
FIG. 1 illustrates an example check processing system.

FIG. 1 illustrates an example check processing system 100 that can be used in accordance with an embodiment of the present invention. A point of sale (POS) terminal 102, a check MICR reader 104, an optical check scanner 105, and a magnetic stripe reader 106, are located at a merchant site. The POS terminal 102 may also include a bar code reader. While the POS terminal 102, the check MICR reader 104, the optical check scanner 105, and the magnetic stripe reader 106 are shown as physically separate devices, two or more of the devices 102-106 can be integrated into the same housing or transaction terminal. Thus the term transaction terminal as used herein is a device which allows a user to interact with the communication medium 110 and to communicate with other portions of the check processing system 100, such as the POS terminal 102, a computer workstation, a local area network of individual computers, a kiosk, a personal digital assistant, a telephone, a biometrics device used to receive biometrics information, a private label card, a radio frequency device, an interactive wireless communications device, an interactive television, or the like.

The POS terminal 102 includes a keyboard for manual data entry and optionally includes a dial-up modem, ISDN modem or other modem for connecting to a communications medium, such as a network 110. The MICR reader 104 includes a magnetic read head (not shown) positioned adjacent a MICR slot (not shown) that is used to read MICR characters on a check. The MICR readings are then converted to digital representations. Alternatively, the MICR characters can be read optically using a scanner and optical character recognition (OCR). In addition, the MICR data may be provided using bar codes, which are read optically using the bar code reader. Unfortunately, the MICR reading or entry process is often faulty and so electronic checks often fail to clear, as discussed in greater detail below.

The magnetic stripe reader 106 includes a magnetic read head (not shown) positioned adjacent a card swipe slot (not shown) that is used to electronically read a magnetic stripe on an identification card, such as a driver's license, bank card, or the like.

The devices 102-106 are networked to a check acceptance system 108 via the network 110. The network 110 can be a private network or a public wide area network, such as the Internet. In other embodiments, the communications medium 110 can be any communication system including by way of example, telephone networks, wireless data transmission systems, two-way cable systems, customized computer networks, interactive kiosk networks, automatic teller machine networks, interactive television networks, and the like. The check acceptance system 108 includes a host computer and transaction database 109, located on a server system, used to log and store transaction information. The term computer, as used herein, comprises one or more computers. The computers comprise, by way of example, processors, program logic, or other substrate configurations representing data and instructions, which operate as described herein. In other embodiments, the processors can comprise controller circuitry, processor circuitry, processors, general-purpose single-chip or multi-chip microprocessors, digital signal processors, embedded microprocessors, microcontrollers and the like.

The transaction database 109 may include two or more databases which record uncollected and cleared check information for checks processed by the check acceptance system, and an administrative database. The check acceptance system 108 can be owned or operated by the merchant or by a separate business entity. The check acceptance system 108 is networked via a network 112 to a clearinghouse 114, such as the Automatic Clearinghouse (ACH), the Federal Reserve, a private clearinghouse, or the like. The clearinghouse 114 is in turn networked to a plurality of banks, including a drawee's or payor's bank 116 with which a customer has a checking account, and a bank with which the merchant has an account. The term "bank" as used herein includes banks, saving & loan institutions, thrifts, and other financial institution that offer accounts on which a check may be issued. In other embodiments, a clearinghouse is not used as part of the check processing system 100 and the check acceptance system 108 interfaces directly with the banks 116.

When a payor, such as a customer, desires to make a purchase or complete a transaction using a check, the customer drafts a check and gives it to the POS operator. If the check is to be electronically processed for ACH, the consumer and the check acceptance system 108 may have to first authorize the transaction for automated electronic check processing. A "check" refers to a draft or order for a certain sum of money payable on demand to a certain person or entity named therein or to his order or to bearer. A check is drawn upon a bank or financial institution and purports to be drawn upon a deposit of funds available to the drawer. Thus, a check can be a physical, paper check, an electronically processed check, or a check card. The face of a paper check typically includes the drawer's name and address and the name and location of the bank on which the check is drawn. In addition, paper checks include magnetic ink character recognition (MICR) characters or indicia that may be read electronically. The MICR characters typically include the drawer's account number, the drawee bank's transit or routing number, and the check sequence number. The term "account number" or "license number" as used herein includes an account identifier or license identifier having only numbers, both numbers and letters, or numbers, letters and/or other symbols. An example standard for the form of the MICR characters and their position along the bottom edge of the check are prescribed by ANSI standards X9.27-2000 and X9.13-1999, respectively, which are published by the American National Standards Institute, Inc.

The POS operator collects a variety of transaction information using one or more terminals, collectively referred to as a transaction terminal. For example, the operator enters transaction information, including the dollar value of the transaction, via the POS terminal 102 keyboard. In addition, the operator scans the check using check MICR reader 104, which reads the MICR indicia. The operator optically scans the completed check using the optical check scanner 105 and the scanned image is stored locally or on a merchant server (not shown). Alternatively, a film camera can be used to photograph an image of the completed check, wherein the photograph is stored on film. The physical check may then be given back to the customer or may be stored for future reference by the merchant if allowed by law. Additional customer identification information may be collected by scanning the magnetic strip on the customer's driver's license, state identification card or other supplementary identification device using the magnetic stripe reader 106. The identification information can include one or more personal identifiers associated with the customer, such as the customer's driver's license number, social security number, address, phone number, toll road transponder ID, and the like. Further, the customer may be asked to key in a personal identification number (PIN) associated with the customer's checking account. Optionally, rather than scanning a card or other identification device, the operator or customer manually enters the identification information using a keyboard coupled to the POS terminal 102.

Some or all of the transaction information is then transmitted using the POS modem or other communication device over the network 110 to the check acceptance system 108. The check acceptance system 108 then stores the information in the transaction database 109. The check acceptance system 108 optionally provides the POS operator authorization to accept or decline the check.

The check processing service then submits the MICR data to the check clearinghouse 114. The MICR data can include the checking account number, routing number, check amount, check number, and other related information. If the account and routing numbers are correct and there are sufficient funds in the customer's account, the clearinghouse instructs in the customer's bank 116 on which the check is drawn to deposit the necessary funds in the merchant's bank 118. The customer's account is then debited for the amount of the check by the customer's bank 116 and the merchant's account in correspondingly credited by the merchant's bank. If the account number or the routing number is incorrect, the check will not clear. The operator of the check acceptance system 108 is informed that the check has been returned, why the check was returned, as well as the check account and routing number provided when the check was submitted to the clearinghouse.

Figure 2A:
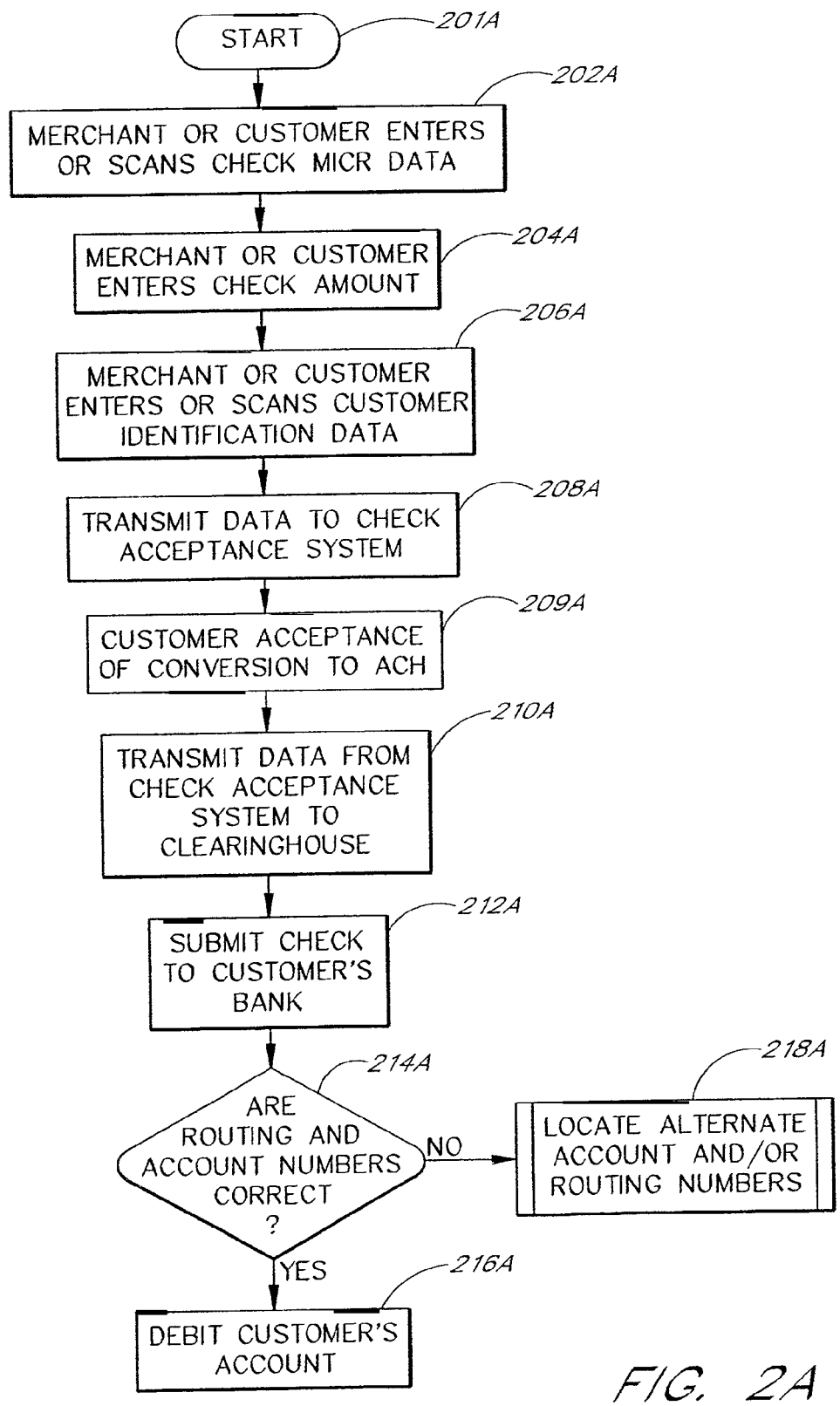
FIG. 2A illustrates an example check processing process.

FIG. 2A is a flow diagram illustrating in greater detail the overall check processing process 200A used to process a customer or consumer check transaction. The process can be used with a physically processed check, an electronically processed check, and/or a check or debit card whose use is analogous to a check, and the like. However, the process 200A is particularly useful where the check processor does not have access to a physical check and hence cannot simply re-scan misread, miskeyed, or otherwise corrupted MICR data. Beginning at state 201A, the process proceeds to state 202A, wherein the consumer or merchant enters or scans check data into a transaction terminal. The merchant may initiate a transaction by inserting a check into the MICR reader or by manually entering the MICR data using a terminal keypad. As discussed above, the MICR characters can also be read optically and converted into text using OCR. In addition, the check account data, bank routing data, and the like can be stored on a magnetic stripe, such as that found on credit cards, debit cards and the like. The magnetic card can be read using magnetic stripe reader positioned in proximity to the transaction terminal's card swipe slot. Further, the MICR data can be entered into a form, such as an electronic form displayed on a monitor, or on a paper form, by the merchant or consumer.

If the check is electronically read using the MICR reader or magnetic stripe reader, the transaction terminal will store the account number, routing or bank transit number, check sequence number, and may optionally attempt to determine whether the check is a personal check or a company check. At state 204A, the merchant or consumer enters the check amount using the terminal's keypad. Proceeding to state 206A, the merchant enters or scans customer or consumer identification data, such as a driver's license number. If the license includes a magnetic stripe, the license can be swiped through the transaction terminal's card swipe slot, and the relevant data, including include the driver's license number and state of issue, will be captured. In some instances, the license or alternate identification data also includes the customer's or consumer' name and address. If the license data is entered manually, the terminal will prompt the merchant to enter the driver's license number and the state using the keypad. Alternatively, the customer identification data can be entered by the merchant or customer into a form, such as an electronic form displayed on a monitor or into a paper form.

At state 208A, the data collected by the merchant is transmitted to the check acceptance system where it is parsed into: routing number, account number, and check sequence number. The parsed data is then stored in a transaction database. At state 209A, if a physical check is being converted for processing as an electronic check, the customer and/or the check processor may optionally first need to provide authorization to do so. At state 210A, using the parsed check MICR data, the check acceptance system electronically submits the check to a check clearinghouse. At state 212A, some or all of the MICR information is transmitted to the customer's bank. At state 214A, a determination is made as to whether the account number and routing number are correct. If they are correct, and if there is sufficient funds in the account, at state 216A the customer's account is debited.

Figure 2B:
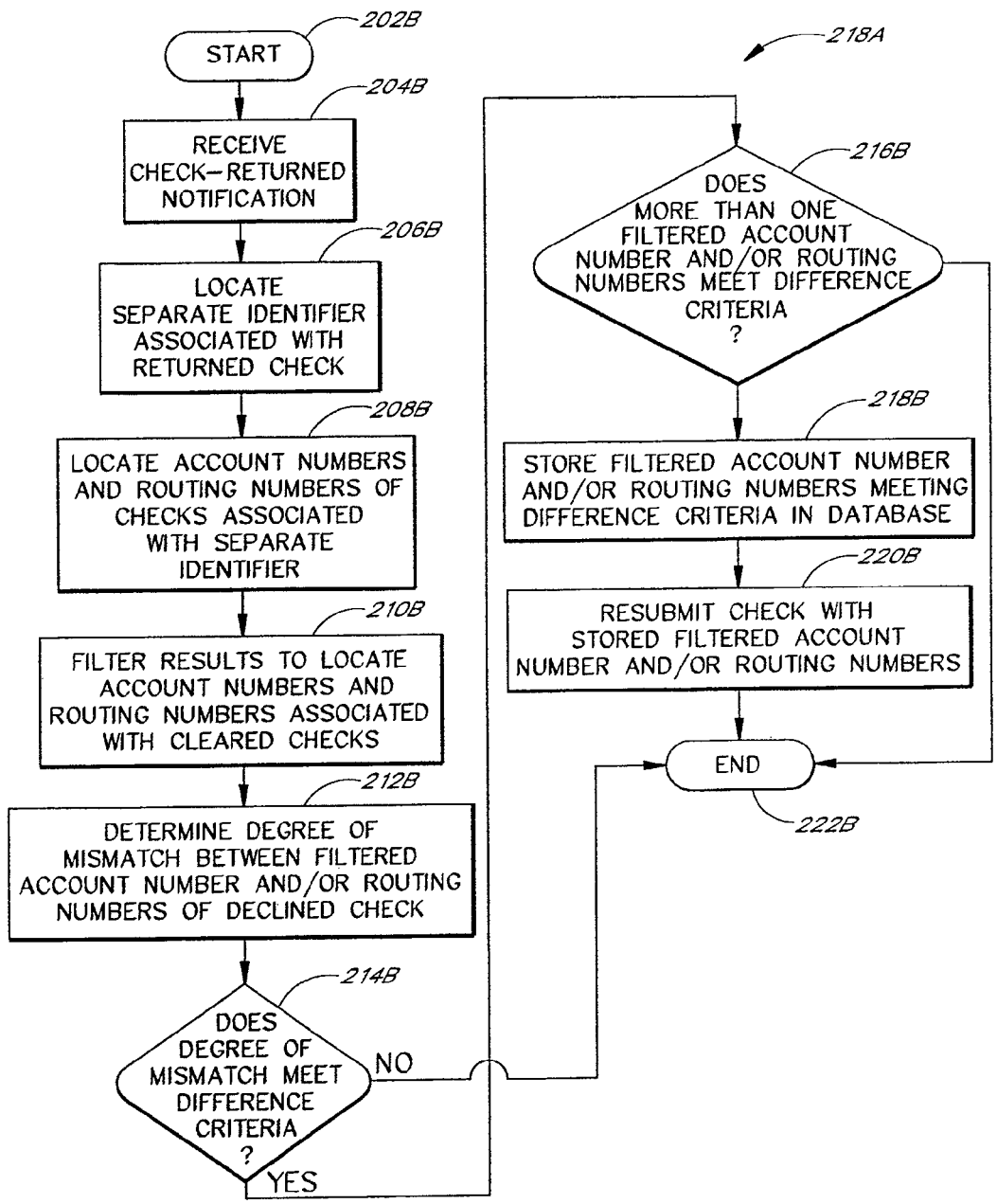
FIG. 2B illustrates a flow diagram illustrating an example embodiment of an alternate account number selection process.

If the check failed to clear because the account number or/and the routing number is incorrect, then at state 218A an alternate account number or/and routing number is potentially selected by the check acceptance system 108. FIG. 2B illustrates a flow diagram illustrating an example embodiment of the alternate account number selection process 218A in greater detail. The process 218A can be implemented using program logic. In one embodiment, the program logic may advantageously be implemented as one or more modules. The modules may advantageously be configured to execute on one or more processors. The modules include, but are not limited to, software or hardware components such as software object-oriented software components, class components and task components, processes methods, functions, attributes, procedures, subroutines, segments of program code, instructions, drivers, firmware, microcode, circuitry, data, databases, data structures, tables, arrays, and variables stored in computer readable memory.

Beginning at start state 202B, the process proceeds to state 204B, where a check-returned notification is received. The notification includes the account number and routing number that had originally been submitted to the clearinghouse, the check number, and the reason the check was declined, in this case, because the account number or/and routing number is invalid. At state 206B, the transaction database is searched to locate the customer's personal identifier using the invalid account number and/or routing number as a search key. As previously discussed, the transaction database can actually include multiple databases. The search can optionally be limited to a specific time period, such as the previous 2 years or any other time frame, including time frames occurring after the non-cleared check was drafted. The previously stored transaction information, including the customer identification information, such as the customer's ID number, is retrieved.

At state 208B the identification information is then used as a search key to locate other check transactions recorded in the transaction database associated with the same identification information. At state 210B, the located check transactions are further filtered to locate check transactions where the check was successfully processed. This filter operation is performed to locate MICR data, such as check account numbers and/or associated routing numbers that have proven to be valid. The filter operation may also be used to limit the results to a designated period, such as checks that were drawn or cleared within the last year. At state 212B, the check account numbers associated with the filtered check transactions (hereinafter "filtered valid MICR numbers") are compared using predetermined criteria with the invalid or corrupted account number and/or routing number at issue. In one embodiment, the comparison is performed on a character-by-character basis and then the degree of mismatch is determined. The term character, as used herein, includes numbers, letters, symbols, and the like. When the account or routing "number" includes numbers, as opposed to only symbols, the comparison can be performed by subtracting the retrieved valid account number from the invalid account number to generate a subtraction result. The following is an illustrative example:

If the invalid account number is: 123456789
and a retrieved valid account number is: 128456788
the following subtraction is performed between the invalid account number and the valid filtered account number:
123456789 Invalid Account Number
128456788 Valid Account Number
005000001 Subtraction Result The number of character mismatches is determined for each of the valid filtered account numbers. This can be performed by determining how many non-zero digits there are in the subtraction result. In the above example, there are two non-zero characters, the "5" and the "1". A similar operation can be performed for an incorrect or invalid routing number.

In another embodiment, both the valid check account numbers and routing numbers, also referred to respectively as the "new account number" and the "new routing number," are compared using predetermined criteria with the invalid, corrupted account number and/or routing number at issue. The account number and routing number received with the check, also referred to respectively as the "old account number" and the "old routing number", are concatenated together. The concatenation of the old account number and the old routing number is compared to a concatenation of the new account number and the new routing number. The comparison can be performed on a character-by-character basis using a software compare command which returns a "0" value if two characters match and a "1" if they fail to match. Once the comparison is complete the number of "1s" are summed and the sum indicates the degree of mismatch.

The following is an illustrative example:
If the old routing number is: 987654321
and the old account number is: 123456789
then the concatenated old routing and account numbers is:
    987654321123456789
If the new routing number is: 987654322
and the new account number is: 133456789
then the concatenated new routing and account numbers is:
    987654322133456789
The degree of mismatch is then determined as follows:
987654321123456789 (concatenated old routing number and old account number)
is compared with
987654322133456789 (concatenated new routing number and new account number)
000000001010000000 Comparison Result
Sum of digits of comparison result {000000001010000000}=2

In the above comparison example, there are two "1s", indicating a degree of mismatch of two.

At state 214B a determination is made as to whether the number of character mismatches meets an acceptance criteria, which in this example is defined as "is the number of character mismatches less than or equal to a predetermined number." If the number of character mismatches meets the acceptance criteria, this indicates that the valid filtered account number and/or routing number is a possible "match" for the invalid account number and/or routing number. The predetermined number selection can be based on how certain the operator of the check acceptance system 108 wants to be that a true match has been located. If the operator desires a relatively high degree of certainty, the predetermined number, also referred to as the "difference criteria," may be set to "1," that is, the invalid account number and/or routing number can differ by the valid filtered account number and/or routing number by only one character. By way of another example, if relatively less certainty is required, the difference criteria may be set to "3", that is, the invalid account number and/or routing number can differ by the valid filtered account number and/or routing number by three characters. Of course other criteria can be used as well.

At state 216B a determination is made as to whether more than one of the valid filtered account numbers and/or routing number is a potential close match for the invalid account number and/or routing number based on the criteria used at state 214B. If more than one valid filtered account number and/or routing number has been determined to be a possible close match, then optionally the process proceeds to end state 222B, and the check is not resubmitted using one of the potential matches as an alternate account number and/or routing number. This is because with more than one potential match the operator may not want to risk resubmitting the check with a valid, but incorrect account number and/or routing number. For example, a customer may have two checking accounts that differ by only one digit and so it may not be possible to determine which account number is correct if the one digit that is different is in the same location as the misread or miskeyed MICR character. In such a situation, a call to the customer's bank can be made to determine or verify the correct account number. Alternatively, the process performed at state 214B is repeated using narrower "match" criteria. For example, if originally the difference criteria was set to "3", the comparison process can be repeated with the difference criteria set to "1". If there is still more than one potential match, then the process will end as similarly discussed above.

If only one potential matching filtered valid account number and/or routing number is found, then at state 218B the potential matching filtered valid account number and/or routing number is stored in the transaction database in association with the transaction information for the check. At state 220B the check is resubmitted to the clearinghouse with the filtered valid account number and/or routing number. The process then ends at state 222B and the check is settled. Optionally, if the check still fails to clear, an entry is created in the transaction database indicating that the filtered valid account number and/or routing number should not be used in the future as an alternate account number and/or routing number for the invalid account number. A report can be generated periodically providing the number of check transactions that have been successfully cleared as a result of the process 218A. The example process 218A can be performed automatically using a computer, or all or portions of the process 218A can be performed manually by a human operator. While the example process 218A as illustrated is discussed with reference to processing an incorrect or invalid check account number, the process can also be applied to other misread or miskeyed check fields or other types of data.

In one embodiment, the difference criteria can be varied depending on a variety of factors. By way of example and not limitation, if the value of the check exceeds a predetermined threshold, then the difference criteria can be set to tolerate a larger or a smaller degree of differences. By way of another example, if the potential matching filtered valid account number and/or routing number has not been used within a predetermined amount of time, such as one year, then the difference criteria can be set to tolerate a smaller degree of difference. Of course, other factors may affect what difference criteria are used. In addition, the comparison of the invalid check account number to the filtered valid check account numbers can optionally be weighted so that certain MICR character position differences are weighted more heavily in the comparison than others. Optionally, only the values of selected predetermined character positions are compared.

The process 218A can result in a greater than 60% clearance rate for checks that have previously been declined due to an improper MICR character reading. This results in a higher check clearance rate. Because more checks are cleared, the merchant's collections are improved, or, if the merchant utilizes the services of a check processor, the check processor's collections are improved.

FIG. 3 illustrates a portion of an example MICR replacement table 300 generated as a result, of a search for alternate MICR data that are potential replacements for misread, miskeyed or otherwise corrupted account numbers and/routing numbers. The table has 16 columns or fields. The fields are as follows:

Area: This is an internal identifier that can be associated, by way of example, with a region, state, the Internet, or the like, where the check at issue that failed to clear ("the check at issue") was submitted, or the Area can be unrelated to the region of origin, that is, not associated with a particular region or state.

Log_Num: This is the log number assigned to the transaction involving the check at issue. The combination of the Area value and the Log number can be used to uniquely identify a given transaction.

DIGIT_DIFF: This field is used to store the difference between the check at issue's concatenated routing number ("old routing number") and account number ("old account number"), wherein one or both of the old routing and account numbers may have been incorrectly read, and a concatenation of successfully process check's valid routing number ("new routing number") and a valid account number ("new account number").

RT_DIFF: This field is used to store the difference between the "old" routing number, stored in the OLD_RT field, and a selected alternate, valid routing number associated with the successfully processed check, stored in the NEW_RT field. This field is used in embodiments where alternate routing numbers are located to use in place of a corrupted routing number.

ACCT_DIFF: This field is used to store the difference between the "old" account number stored in the OLD_ACCT field, and a valid account number for a successfully processed check, stored in the NEW_ACCT field.

OLD_RT: This field is used to store the routing number of the check at issue.

NEW_RT: This field is used to store a valid routing number read from the successfully processed check, wherein the valid routing number is potentially to be used in place of the routing number in the OLD_RT field.

OLD_ACCT: This field is used to store the checking account number of the check at issue.

NEW_ACCT: This field is used to store a valid account number of a successfully processed check to potentially be used in place of the account number in the OLD_ACCT field.

CHECK_NUM_COLL: This field is used to store the check number of the check at issue.

CHECK_AMT_COLL: This field is used to store the check amount for the check at issue.

RCV_DT: This field is used to store the date the check at issue was returned to the check processor.

PRSN_ID_1: This field is to be used to store a personal identifier, such as a driver's license or social security number that was provided when the check at issue was submitted to the merchant.

STAT_CDE: This field is used to stored a status code (for example, "A"=active)

SUBSCR_CODE: This field used to store the subscriber code to which the check was written and can be uniquely associated with a given merchant or store.

SOURCE_AREA: This field indicates the Area value for the transaction associated with the successfully processed check corresponding to the routing number and account number in the NEW_RT field and the NEW_ACCT field.

SOURCE_MICR: This field indicates which database stores the transaction data associated with the check corresponding to the routing number and account number in the NEW_RT field and the NEW_ACCT field. For example, the database can be the Call Detail database or the Collections database.

By way of example, in record 302, the routing number 322271627 in the OLD_RT field and the account number 73439365101 in the OLD_ACCT field correspond to a check that failed to clear. A driver's license number CFP0428027 in the PRSN_ID_1 field is associated with the payor of the check. The driver's license number has been used as a search key to locate data from another check associated with the driver's license number. The routing number 322271627 in the NEW_RT field and the account number 7343986511 in the NEW_ACCT field correspond to a check associated with the driver's license number in the PRSN_ID_1. As indicated in the RT_DIFF and ACCT_DIFF fields, the "old" routing number matches the "new" routing number, and the "new" account number differs from the "old" account number by "3". The DIGIT_DIFF field stores the result of a comparison of a concatenation of "old" routing and account numbers in the OLD_RT and OLD_ACCT fields with a concatenation of the routing and account numbers in the NEW_RT and NEW_ACCT fields. In this example, they differ by three digits. If the acceptance criteria is set to three, the "new" account number is a suitable alternate for the "old" account number. If the acceptance criteria are set to two or less, the "new" account number is not a suitable alternate for the "old" account number.

Optionally, the search for alternate MICR or account data can be restricted so as to exclude checks associated with certain Source Areas, such as those checks wherein the account data was received as part of an Internet transaction. This advantageously excludes certain areas that have a significantly higher likelihood of having incorrect or falsified MICR or account data. Similarly, the search for alternate MICR or account data can be restricted so as to exclude checks associated with certain Subscriber Codes or exclude checks written to merchants who historically have a high level of inaccuracies in their MICR data readings.

As illustrated in FIG. 3, several potential match record may be provided for a given corrupted account number and/or routing number. There may be several potential matches because there are several previously processed checks associated with the same personal identifier. Thus for example, records 304, 306, 308 contain the search results for alternate MICR to use in place of "old account" number 40534708. Each of the records 304, 306, 308 includes MICR data corresponding to previously processed checks that are associated with the same personal identifier, LA7082383, in the PRSN_ID_1 field. In this example, each previously processed check is associated with a different Source Area. In one embodiment, if there are multiple source areas for previously processed checks, wherein each check has the same account and routing data, then a higher match likelihood is assigned to the "new" account and routing numbers. In this example, each of the records 304, 306, 308 have the same "new" account and routing numbers in the NEW_ACCT and NEW_RT fields. Thus, the value in the DIGIT_DIFF field is the same for all records 304, 306, 308.

Of course other table schema having fewer or additional fields than that shown in FIG. 3 can be used as well.

Thus, as described above, the present invention advantageously provides methods and apparatus for increasing the check clearance rate, even when a check's MICR characters have been misread or miskeyed. The higher rate of check clearance results in financial and operational benefits for the merchant, the check processor, and/or check processor.

While certain embodiments of the inventions have been described, these embodiments have been presented by way of example only, and are not intended to limit the scope of the inventions. Indeed, the novel methods and systems described herein may be embodied in a variety of other forms without departing from the spirit thereof. The accompanying claims and their equivalents are intended to cover such forms or modifications as would fall within the scope and spirit of the inventions.

What is claimed is:

1. A method of selecting alternate magnetic character ink recognition (MICR) data, the method comprising: storing a record of first MICR data associated with a first successfully processed check from a payor; receiving an indication that a second check from the payor failed to clear because at least a portion of second MICR data associated with the second check is incorrect, wherein the second check is different from the first check; reading a personal identification code associated with the payor, wherein the personal identification code was provided in association with the second check; locating the first MICR data associated with the first successfully processed check from the payor using the personal identification code; comparing, at a check acceptance computer, at least the incorrect portion of the second MICR data with a corresponding portion of the first MICR data to determine a number of differing digits; and submitting, by the check acceptance computer, the second check for processing using at least a portion of the first MICR data if the number of differing digits between the compared portions of the first and second MICR data is less than or equal to a predetermined number, the second check having previously failed to clear when submitted for processing using the second MICR data.

2. The method of claim 1, wherein the portion of the second MICR data comprises an account number.

3. The method of claim 1, wherein the portion of the second MICR data comprises an account number and a routing number.

4. The method of claim 1, wherein comparing the at least a portion of the first MICR data with at least the portion of the second MICR data comprises: comparing characters of an account number associated with the failed second check with characters of an account number associated with the first successfully processed check to determine which characters match; and calculating how many characters fail to match.

5. A method of selecting alternate magnetic ink character recognition (MICR) data, the method comprising: receiving an indication that a financial instrument failed to clear, the failed financial instrument comprising invalid MICR data and being associated with a payor; locating valid MICR data of a cleared financial instrument associated with the payor; calculating, at a check acceptance computer, a number of character mismatches between at least a portion of the located valid MICR data and at least a corresponding portion of the invalid MICR data; and determining, at the check acceptance computer whether to store the located valid, MICR data as substitute MICR data for the invalid MICR data based at least in part on the number of character mismatches.

6. The method of claim 5, further comprising:
associating the failed financial instrument with the substitute valid MICR data;
and resubmitting the failed financial instrument with the substitute valid MICR data.

7. The method of claim 5, wherein calculating the number of character mismatches comprises: subtracting the at least a portion of the located valid MICR data and the at least a corresponding portion of the invalid MICR data to produce a subtraction result; and summing a number of non-zero digits in the subtraction result.

8. The method of claim 5, wherein calculating the number of character mismatches comprises: comparing character by character the at least a portion of the located valid MICR data with the at least a corresponding portion of the invalid MICR data; producing a 1 value if the characters match; producing a 0 value if the characters do not match; and summing the 1 values once the comparison is complete.

9. The method of claim 8, further comprising comparing the sum to a threshold.

10. The method of claim 5, wherein the MICR data comprises at least one of a routing number or an account number.

11. The method of claim 5, wherein locating valid MICR data of the cleared financial instrument associated with the payor comprises locating valid MICR data associated with at least one of a driver's license number, a social security number, an address, a phone number, or a toll road transponder ID associated with the payor.

12. The method of claim 5, further comprising excluding located valid MICR data based at least in part on at least one of a source area or a subscriber code associated with the cleared financial instrument.

13. The method of claim 5, further comprising:
locating valid MICR data of more than one cleared financial instrument associated with the payor; calculating the number of character mismatches between the at least a portion of the located valid MICR data and the at least a corresponding portion of the invalid MICR data for each of the cleared financial instruments associated with the payor; determining if the number of character mismatches for each of the cleared financial instruments is less than or equal to a predetermined number; and
if the number of character mismatches for more than one of the cleared financial instruments is less than or equal to the predetermined number, not associating the failed financial instrument with any of the located valid MICR data.

14. The method of claim 13, further comprising not resubmitting the failed financial instrument.

15. A computer program stored on a computer-readable medium configured for selecting alternate magnetic ink character recognition (MICR) data for processing of a financial instrument, the computer program comprising:
computer code stored on the computer-readable medium configured to store a record, of valid first MICR data associated with a first cleared financial instrument associated with a payor; computer code stored on the computer-readable medium configured to receive an indication that a second financial instrument failed to clear, the failed second financial instrument being different from the first financial instrument and comprising invalid second MICR data and associated with the payor, computer code stored on the computer-readable medium to locate the valid first MICR data associated with the first cleared financial instrument associated with the payor; computer code stored on the computer-readable medium configured to calculate a number of character mismatches between at least a portion of the located valid first MICR data and at least a corresponding portion of the invalid second, MICR data; and computer code stored on the computer-readable medium configured to store the located valid first MICR data as alternate MICR data for the invalid second MICR data if the number of character mismatches is less than or equal to a predetermined number.

16. The computer program of claim 15, further comprising:
computer code stored on the computer-readable medium configured to associate the failed second financial instrument with the alternate MICR data; and
computer code stored on the computer-readable medium configured to resubmit the failed second financial instrument with the alternate MICR data.

17. The computer program of claim 15, wherein the computer code stored on the computer-readable medium configured to calculate a number of character mismatches comprises: computer code stored on the computer-readable medium configured to subtract the at least a portion of the located valid first MICR data and the at least a corresponding portion of the invalid second MICR data to produce a subtraction result; and computer code stored on the computer-readable medium configured to sum a number of non-zero digits in the subtraction result.

18. The computer program of claim 15, wherein the computer code stored on the computer-readable medium configured to calculate the number of character mismatches comprises: computer code stored on the computer-readable medium configured to compare character by character the at least a portion of the located valid first MICR data with the at least a corresponding portion of the invalid second MICR data; computer code stored on the computer-readable medium configured to produce a 1 value if the characters match; computer code stored on the computer-readable medium configured to produce a 0 value if the characters do not match; and computer code stored on the computer-readable medium configured to sum the 1 values once the comparison is complete.

19. The computer program of claim 15, further comprising computer code stored on the computer-readable medium configured to exclude located valid first MICR data from consideration as the alternate MICR data based at least in part on at least one of a source area or a subscriber code associated with the first cleared financial instrument.

20. The computer program of claim 15, further comprising: computer code stored on the computer-readable medium configured to locate valid MICR data of more than one cleared financial instrument associated with the payor; computer code stored on the computer-readable medium configured to calculate the number of character mismatches between the at least a portion of the located valid MICR data and the at least a corresponding portion of the invalid second MICR data for each of the cleared financial instruments associated with the payor, computer code stored on the computer-readable medium configured to determine if more than one of the located valid MICR data are potentially correct versions of the invalid second MICR data; and if more than one of the located valid MICR data are potentially correct versions of the invalid second MICR data, computer code stored on the computer-readable medium configured to not associate the failed second financial instrument with any of the located valid MICR data.

* * * * *